United States Patent [19]

Lambert et al.

[11] 4,108,778

[45] Aug. 22, 1978

[54] SELF-CLEANING FILTER AND VORTEXER

[76] Inventors: Steven J. Lambert; Bertha E. Lambert; Warren G. Lambert, all of 2142 Cornwall St., Germantown, Tenn. 38138

[21] Appl. No.: 779,542

[22] Filed: Mar. 21, 1977

Related U.S. Application Data

[63] Continuation-in-part of Ser. No. 661,367, Feb. 25, 1976, abandoned.

[51] Int. Cl.² .................. B01D 35/16; B01D 33/06; B01D 45/12
[52] U.S. Cl. .................. 210/297; 210/330; 210/354; 55/317; 55/337; 55/405; 55/459 R; 210/304; 210/323 T; 210/360 A; 210/388; 210/493 R; 210/512 R
[58] Field of Search .......... 55/290, 317, 337, 400, 55/404, 405, 299, 304, 401, 459 R, 459 A, 459 B, 459 C, 459 D; 210/297, 304, 354, 360 A, 456, 323 T, 330, 370, 385, 388, 493 R, 512 R, 512 M

[56] References Cited

U.S. PATENT DOCUMENTS

| | | | |
|---|---|---|---|
| 1,975,335 | 10/1934 | Smith | 55/317 |
| 2,361,758 | 10/1944 | DeFligue | 55/400 X |
| 2,463,435 | 3/1949 | Smellie | 55/304 |
| 2,651,416 | 9/1953 | van der Mark et al. | 210/330 |
| 3,008,543 | 11/1961 | Bourdale et al. | 55/317 X |
| 3,338,417 | 8/1967 | Heckmann et al. | 210/370 |
| 3,407,572 | 10/1968 | Tolley | 55/299 X |
| 3,443,696 | 5/1969 | Schutte | 210/304 X |
| 3,448,858 | 6/1969 | Delcellier et al. | 210/360 A |
| 3,491,887 | 1/1970 | Maestrelli | 210/330 |
| 3,923,481 | 12/1975 | Farrow | 55/459 C X |
| 3,948,778 | 4/1976 | Muller | 210/330 |

FOREIGN PATENT DOCUMENTS

| | | | |
|---|---|---|---|
| 425,542 | 2/1926 | Fed. Rep. of Germany | 55/405 |
| 564,776 | 6/1957 | Italy | 210/330 |
| 530,498 | 12/1940 | United Kingdom | 210/456 |

Primary Examiner—Charles N. Hart
Assistant Examiner—Robert H. Spitzer
Attorney, Agent, or Firm—Birch, Stewart, Kolasch and Birch

[57] ABSTRACT

A self-cleaning filter and vortexer is provided in which a filter rotates over the clean fluid outlet port of a vortexer cannister in the direction of the flow of fluid into the tangential inlet port of the vortexer. The peripheral velocity of a freely rotating filter will approximate the flow velocity of the fluid into the tangential inlet port to enhance the centrifugal acceleration effect of the vortexer and the dynamic cleaning of the filter medium. This acceleration enhances centrifugal separation of the heavier particulates in the vortexer and enhances the dynamic cleaning of the fines and other particulates from the filter medium. The drive mechanism for rotating the filter may be designed to be uneven so as to shake the filter medium as it rotates. The flow of fluid will pass thru the filter medium and be exhausted as a cleaned fluid into the outlet port of the vortexer cannister. Throughout this disclosure centrifugal refers only to the normal acceleration associated with curvilinear motion while dynamic refers to all three components of relative curvilinear motion, namely, normal, Corolis and tangential. The vortexer (cyclone) herein referenced to utilizes the centrifugal component only while the rotating filter elements herein referred to are so designed as to utilize all three of the relative curvilinear components, hence the distinction throughout between centrifugal and dynamic effects.

43 Claims, 13 Drawing Figures

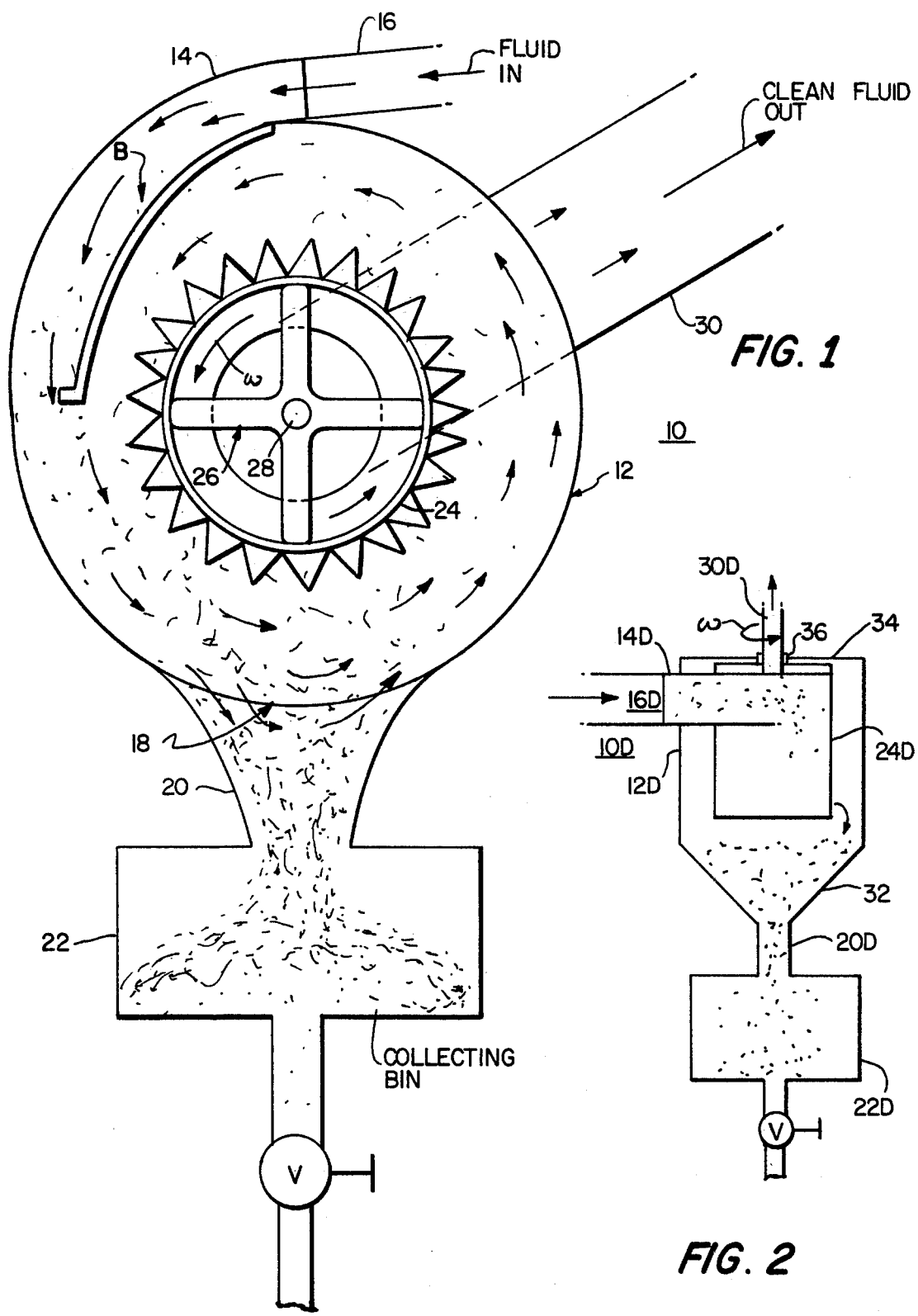

SELF-CLEANING FILTER AND VORTEXER

CROSS-REFERENCE TO RELATED APPLICATIONS

This is a Continuation-in-Part of our co-pending application Ser. No. 661,367, filed Feb. 25, 1976, entitled "SELF-CLEANING FILTER AND VORTEXER", now abandoned.

FIELD OF THE INVENTION

The invention relates to self-cleaning filters and vortexers and more particularly to a combination self-cleaning filter and vortexer structure for removing large and fine particulate contaminants from a stream of fluid.

BACKGROUND OF THE INVENTION

In the separation of particulate materials from fluid streams, the use of a vortexer or cyclone to extract large particulate materials by centrifugal acceleration is a known expedient. Such vortexers include a fine particulate material filter means adjacent the fluid outlet to further remove finer particulates.

When relatively heavy amounts of large particulate, fines and dust are present in the fluid stream to be cleaned, the filter's medium cakes or clogs quite rapidly. This necessitates the continual mechanical cleaning or replacement of such filter medium at frequent intervals, resulting in expensive labor and material costs.

OBJECTS OF THE INVENTION

Therefore, it is an object of the present invention to provide a new and novel combination vortexer and filter means wherein the filter means is dynamically self-cleaning, i.e., no mechanical shaking or reverse air blast is necessary.

Another object of the present invention is to provide a new and novel combination vortexer and filter means wherein the filter means is dynamically self-cleaning and wherein the filter and vortexer may be oriented about either a vertical or horizontal axis or any angle there between.

Yet another object of the present invention is to provide a new and novel vortexer and self-cleaning filter means wherein the filter means rotates in the direction of fluid flow in the vortexer.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

Vortexer cannisters having tangential inputs for fluid flow about either a horizontal, inclined, or vertical axis are provided with a centrifugal extraction slot for particulates positioned and defined in a wall thereof substantially diametrically opposed to and/or axially shifted from the tangential inlet.

An axially disposed clean fluid outlet is provided which communicates with the interior of the vortexer cannister through a rotating filter cannister of substantially cylindrical shape which is preferably, but not necessarily, placed coaxially with the circulation axis of the vortexer cannister.

The filter cannister may be rotated by the fluid in the direction of fluid flow or at an arbitrary angular velocity in the cannister. The filter cannister serves as a tangential particle impeller as well as generating a dynamic effect on its surface which renders it self-cleaning by flinging caked particulates and fines outward into the vortexing fluid stream and subsequently out through the extraction slot. If a drive mechanism is utilized, it is designed to produce an uneven roation so as to shake the filter cannister.

The drive mechanism includes a shaft coaxially positioned within the exhaust flow path. A fan means is positioned on the shaft to enhance the discharge of the cleaned fluid.

The filter cannister may be constructed from a plurality of elongated cylindrical filters connected to a plenum chamber which forms a part of the exhaust flow path for the cleaned fluid. The plenum chamber may be positioned either horizontally or vertically within the vortexer with the elongated cylindrical filters projecting axially or radially, respectively, therefrom.

A suitable collecting bin is provided to receive the particulate discharge from the extraction slot.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a cross-sectional schematic of a vortexer and self-cleaning filter structure with a horizontal vortex and filter axis;

FIG. 2 is a cross-sectional schematic of a vertically disposed self-cleaning filter and vortexer of the present invention;

DETAILED DESCRIPTION OF THE DRAWINGS

Figure 3:
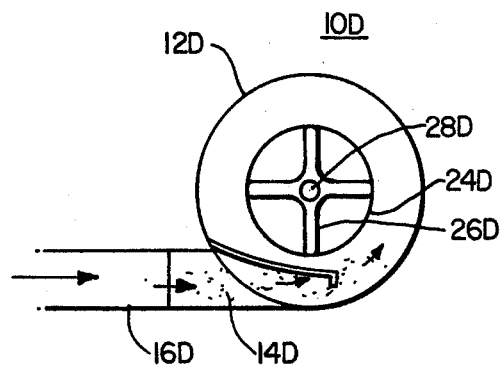
FIG. 3 is a top plan view of the embodiment of FIG. 2.

Referring first to FIG. 1, a self-cleaning filter and vortexer unit generally indicated by 10 is shown as including a vortexer cannister 12, illustrated as a cross section of a cylinder placed with its longitudinal center axis in a horizontal plane, said cannister 12 having a tangential input duct 14 coupled to a conduit 16 bearing fluid laden with particulates.

On a substantially diametrically opposed section of the vortexer cannister from the said tangential input duct 14 is a peripheral output or collecting slot 18 connected by a particulate exhaust conduit 20 to a particulate collecting bin 22.

A substantially cylindrical filter means 24 is mounted on a squirrel cage 26 or the like which is mounted on a shaft 28 having an axis of rotation coincident with the longitudinal axis of the vortexer cannister 12.

The filter 24 and support cage 26 are rotated in the same direction as the circulation of fluid and particulates admitted to the cannister 12 through the tangential input duct 14. As viewed in FIG. 1, the direction of flow in the vortexer cannister and, thus, the rotation of the filters is counterclockwise.

When the rotational velocity ω of the filter 24 is greater than zero, the filter 24 acts as an impeller to increase the flow velocity of fluid and particulate in the vortexer cannister. This increase in velocity enhances the centrifugal separating action of the vortexer which carries particulates to the collecting slot 18 and precludes caking of fines and other particulates on the filter 24 by effecting a dynamic self-cleaning action.

Fluid passes through the filter 24 and out through a clean fluid duct 30 and is thus cleaned by the centrifugal action of the vortexer cannister 12 and the dynamic filtering action of the filter 24.

The filter 24, cage 26 and shaft 28 can be driven by suitable motor means such as will be further described with reference to FIG. 5.

It should be noted that the filter 24 may be so shaped and so proportioned as to be rotated by the action of the incoming fluid and particulate from the input duct 14. In this case, the peripheral velocity ω of the filter 24 approaches the flow velocity of the vortexed fluid and particulate. This velocity is sufficient to provide the filter 24 with the desired self-cleaning action due to the dynamic force generated by its rotation. No motor is needed in this embodiment. The filter 24, cage 26 and shaft 28 may be mounted for free rotation over the entrance to the clean air duct 30.

Figure 4:
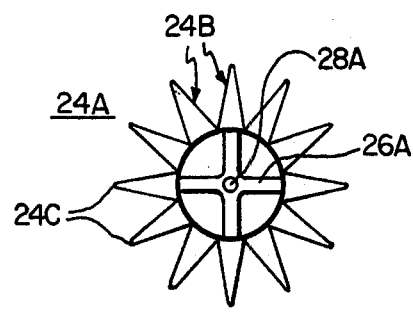
FIG. 4 is a top cross-sectional schematic of an illustrative filter structure.

FIG. 4 shows an example of a shaped filter 24A which provides a large filter surface. This filter will act as a turbine and may be driven by the incoming fluid and particulate of the vortexer.

The filter 24A includes a rotary shaft 28A, a cage structure 26A and a plurality of radially re-entrant filter surfaces 24B which are joined to form radial fingers 24C.

Many other filter shapes may be utilized with the present invention so long as they may be driven in rotation either by the fluid to be cleaned or by suitable motor means.

A vertical self-cleaning filter and vortexer 10D having a vortexer cannister 12D is shown in FIGS. 2 and 3, wherein like elements to FIG. 1 bear like numerals with the suffix D.

The vortexer cannister 12D includes a necked-down portion 32 at the lower end of the vortexer cannister 12D which directs particulates and fines through a particulate exhaust duct 20D into a particulate collecting bin 22D.

The filter 24D is rotatably mounted in a top plate 34 of the vortexer cannister 12D by suitable bearing means 36. The clean fluid outlet duct 30D extends from the top plate 34 coaxially with the rotating filter 24D.

Figure 5:
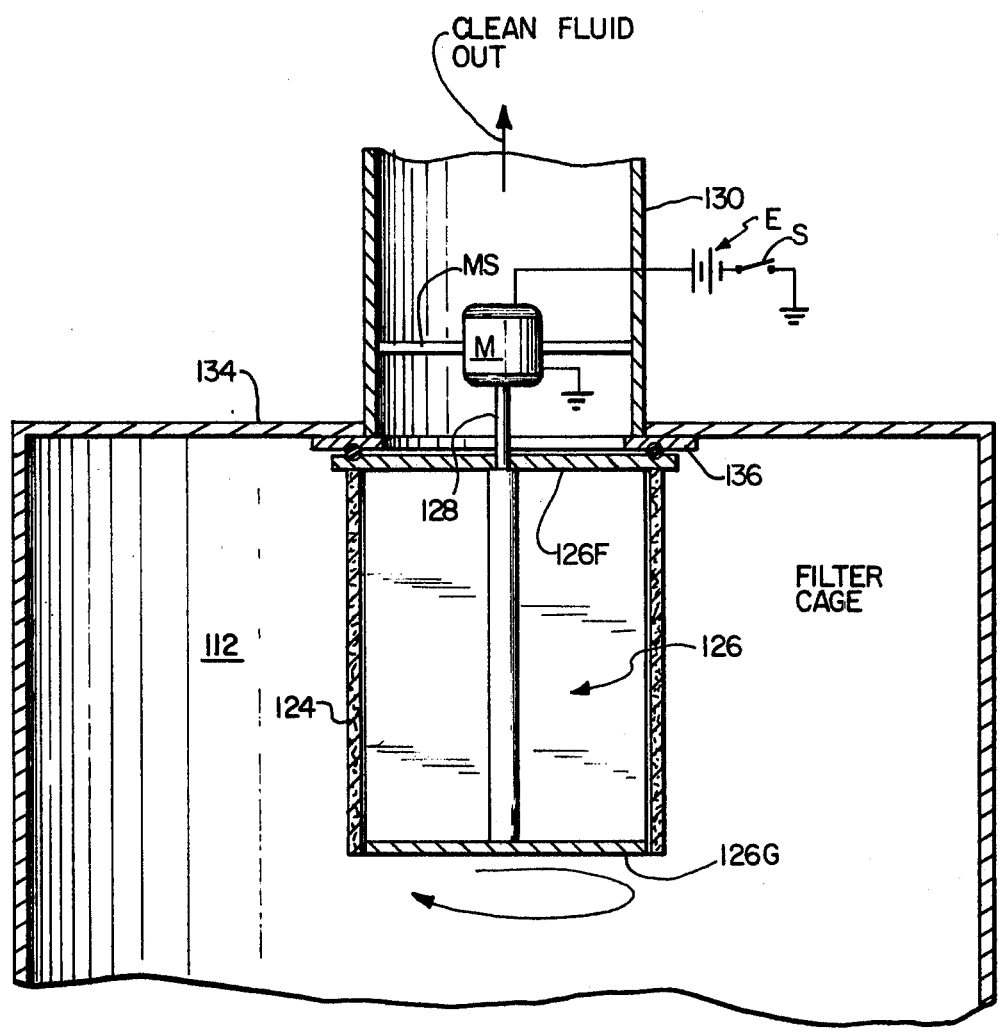
FIG. 5 is an illustrative embodiment of a motor driven rotary filter means of the present invention.

Referring now to FIG. 5, a motor M driven from a source of electricity E and controlled by ON-OFF switch S is shown mounted adjacent a top or end plate 134 of a vortexer cannister 112.

The motor M is mounted on a spider MS across the mouth of a clean fluid outlet duct 130 and has its output shaft 128 keyed into a base spider 126F of a filter cage 126. The base spider 126F is mounted against the bearing and sealing means 136 by any suitable mounting means.

The filter cage 126 includes an end plate 126G at the opposite end thereof from the base spider 126F. A filter sleeve 124 may be mounted over the cage 126 to permit fluid to flow therethrough and through the base spider 126F, past the motor M and the motor spider MS into the clean fluid outlet duct 130.

In the embodiment of FIG. 1, the plate 134 would be positioned in a vertical plane. In the embodiment of FIGS. 2 and 3, the plate 34 would be positioned in a horizontal plane. Thus, FIG. 5 illustrates a preferred form of motor drive for the filters 24 and 24D which is universally adapted to the embodiments of FIGS. 1, 2 and 3.

In operation, fluid contaminated with particulates is fed into the input ducts 14, 14D of the vortexer cannisters 12, 12D from the conduits 16, 16D and a vortex is created within the vortexer cannisters.

The heavier particulate materials in the fluid are flung outwardly against the walls of the cannisters 12, 12D by the centrifugal effect which is enhanced by the rotating filter. Any remaining fines and particles are filtered dynamically from the fluid as it passes through the filters 24, 24D.

Thus, by maintaining back pressure, such as by the closed collecting bins 22, 22D, all of the heavier particulates and the fines eventually are deposited in the collecting bins 22, 22D and the cleaned fluid exits the cannisters 12, 12D through the outlet ducts 30, 30D.

If a motor M drives the filters 24, 24D at a velocity greater than zero and in the same direction as the flow of particulate laden fluid in the vortexer cannister 12, 12D, each cubic foot of fluid admitted into the vortexer cannister is presented with an increased amount of filter surface per minute and is accelerated for better centrifugal separation of particulates. Further, the filters 24, 24D are self-cleaning as a result of the dynamic effect generated by the rotation of the filters. This dynamic effect flings fines and other particulates off the filter surfaces for ultimate entrapment in the particulate collecting bins 22, 22D.

The axes of rotation 28, 28D of the filters 24, 24D are preferably coaxial with the vortexer cannisters 12, 12D but may be parallel or skewed with respect thereto.

Furthermore, any desired cross-sectional shape may be utilized for the filters 24, 24D.

Free rotation of the filters 24, 24D may be achieved by use of turbine like impellable shapes for the filter, such as shown at 24A in FIG. 4. This shape provides a self-cleaning action and enhances the available surface of the filter since the peripheral velocity of the filters 24, 24D will approach that of the particulate laden gases in the cannisters 12, 12D.

In all embodiments of the present invention, a baffle B, as shown in FIGS. 1 and 3, may be added along the length of the filter 24 which is substantially coextensive with at least a full quadrant of arc of the vortexer cannister.

In the standard cartesian system, as applied to FIG. 1 the baffle B and the fluid inlet 14 would be in the position shown with respect to the second quadrant (90° to 180°) of a catesian coordinate system having the center of its two axes on the axis of rotation 28 of the filter 24 and the fluid inlet 24 in the same quadrant as the baffle B.

In the vertical mode, the baffle B is positioned adjacent the filter 24D in a manner similar as to that illustrated in FIG. 3.

The baffle B acts to produce a vortex motion in the incoming fluid containing particulate matter and at the same time provides more efficient rotational performance of the filter 24. The initial entry of the fluid into the vortexer cannister is shielded from the filter 24 by the baffle B.

In the freely rotating mode of the filter 24, relatively cleaner fluid circulates between the baffle B and the surface of the filter 24 (as best shown in FIG. 1) to cause rotation of the filter 24.

All of the foregoing embodiments may be utilized to clean fluid in a wet mode as well as a dry mode.

Spray nozzles for injecting wash water into the inlet ducts combined with suitable wet strength in the filters 24, 24D readily adapts the system to a wet cleaning mode.

Figure 6:
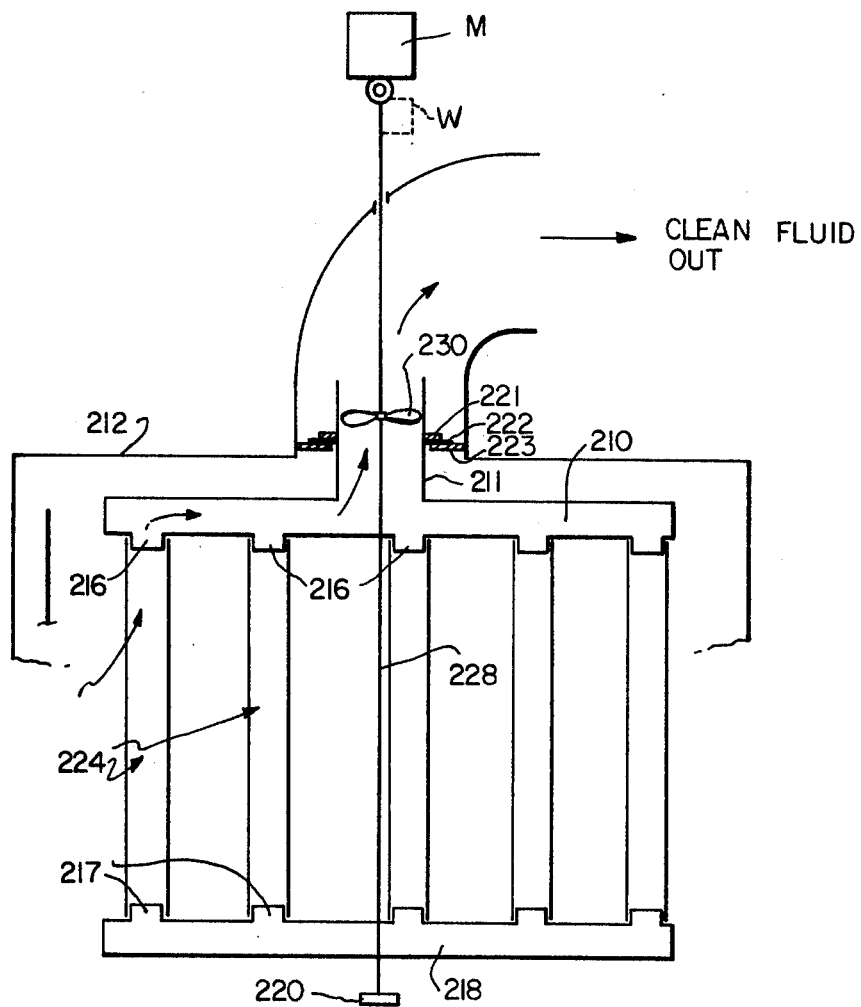
FIG. 6 is a cross-sectional side view of another embodiment of the present invention showing a horizontally disposed plenum including a plurality of vertically positioned elongated cylindrical filters.

Referring now to FIG. 6, another embodiment of the present invention is shown which includes a horizontally disposed plenum 210 and a plurality of vertically positioned elongated cylindrical filters 224. The plenum 210 and the filters 224 are rotatably positioned within a vortexer cannister 212. The plenum 210 includes a plurality of open ended stub members 216 which permit fluid communication between the interior of the filter members 224 and the plenum. The lower end of the filter memebers 224 are connected to stub members 217 which are positioned on the plate member 218. The motor M imparts rotational motion to the shaft 228 which in turn rotates the plenum 210 and the plate member 218. The shaft 228 may be supported by any suitable thrust bearing 220.

As shown in FIG. 6, a fan member 230 may be positioned on the shaft 228 to enhance the exhaust flow of the clean fluid from the vortexer cannister 212. In addition, a dust seal may be provided at the outlet portion of the vortexer cannister by means of a collar member and a thin gasket 222 which are both rotatably supported on the upwardly projecting portion of the plenum 210 and an additional collar member 223 which is affixed to the upwardly projecting portion of the vortexer cannister 212. An excellent dust seal is formed by trapping the thin gasket 222 between the collar members 221 and 223.

Figure 7:
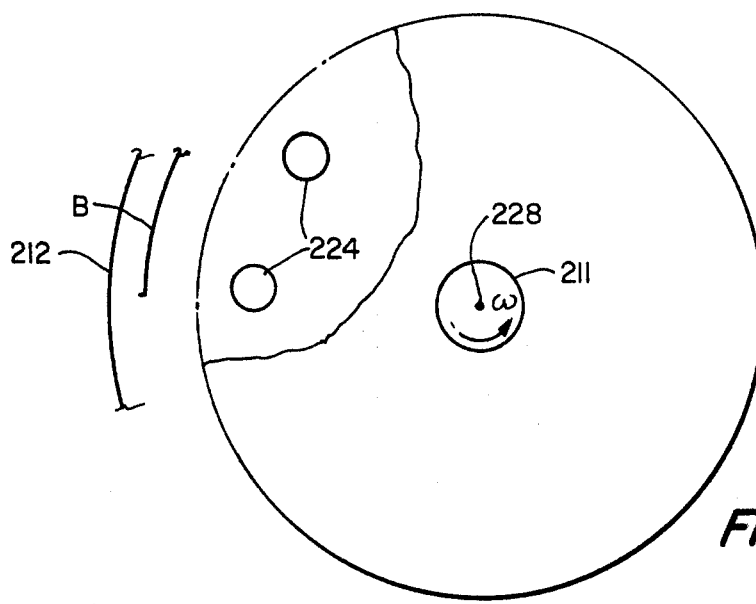
FIG. 7 is a partial cut-away cross-sectional view of the plenum as shown in FIG. 6.

Referring now to FIG. 7, there is shown a partially cut away view of the plenum 210 which shows the upwardly extending portion of the plenum 211 and two of the elongated cylindrical filter members 224. The plenum 210 is rotatably mounted upon the shaft 228 within the vortexer cannister 212. Also, FIG. 7 shows a portion of the baffle B which acts to produce a vortex motion in the incoming fluid containing particulate matter and also prevents the direct impingement of the incoming fluid onto the filter members 224. Further, FIG. 7 shows that the plenum 210 is rotated at an angular velocity $\omega$ about the shaft 228.

Figure 8:
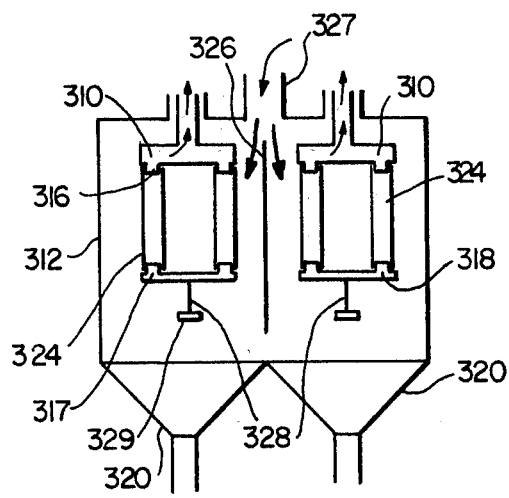
FIG. 8 is a cross-sectional side view of still another embodiment of the present invention showing a plurality of vertically disposed elongated cylindrical filters and a plurality of particle collecting conduits.
Figure 9:
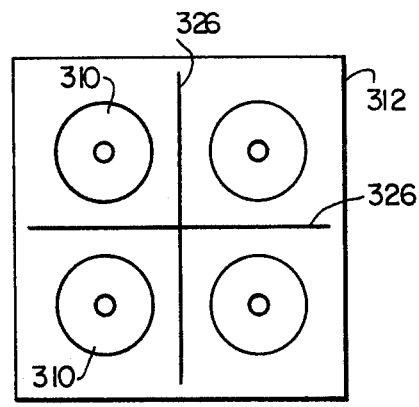
FIG. 9 is a cross-sectional view of FIG. 8.

Referring now to FIGS. 8 and 9, there is shown another embodiment of the present invention wherein a plurality of rotatable plenums 310 are mounted within a vortexer cannister 312. The plenum 310 includes open ended stub members 316 on which the elongated cylindrical filters 324 are mounted. Also, the base plates 318 include a plurality of upwardly projecting stubs 317 upon which the lower end of the elongated cylindrical filter members 324 are mounted.

In the embodiment shown in FIGS. 8 and 9, the rectangular vortexer cannister 312 is divided into four sections by means of the curtain members 326. It should be noted that each partitioned section includes a particulate exhaust conduit 320 mounted adjacent the lower end of the vortexer cannister 312. In addition, as in the embodiments described above, the plenum members 310 are rotatably mounted upon a shaft 328 which is supported by any suitable thrust bearing 329.

Figure 12:
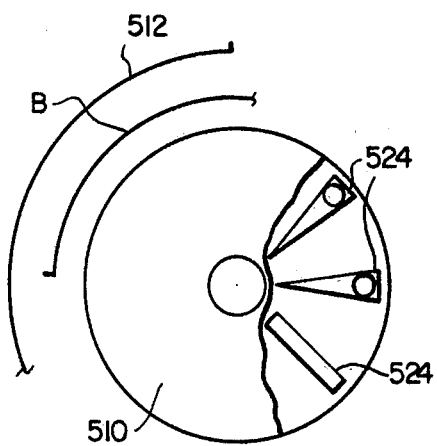
FIG. 12 is a partial cross-sectional view of FIG. 11 showing a couple of different shapes for the multi-sided filter.

In operation, fluid containing particulate matter enters the upwardly projecting portion 327 of the vortexer cannister 312 and is filtered by means of the filter means 324 or 524 FIG. 12. The clean fluid exits through the plenum members 310 or 510 and the particulate material, dust and fines is collected in the particulate exhaust chambers 320, the chambers are not shown in FIG. 12.

Figure 10:
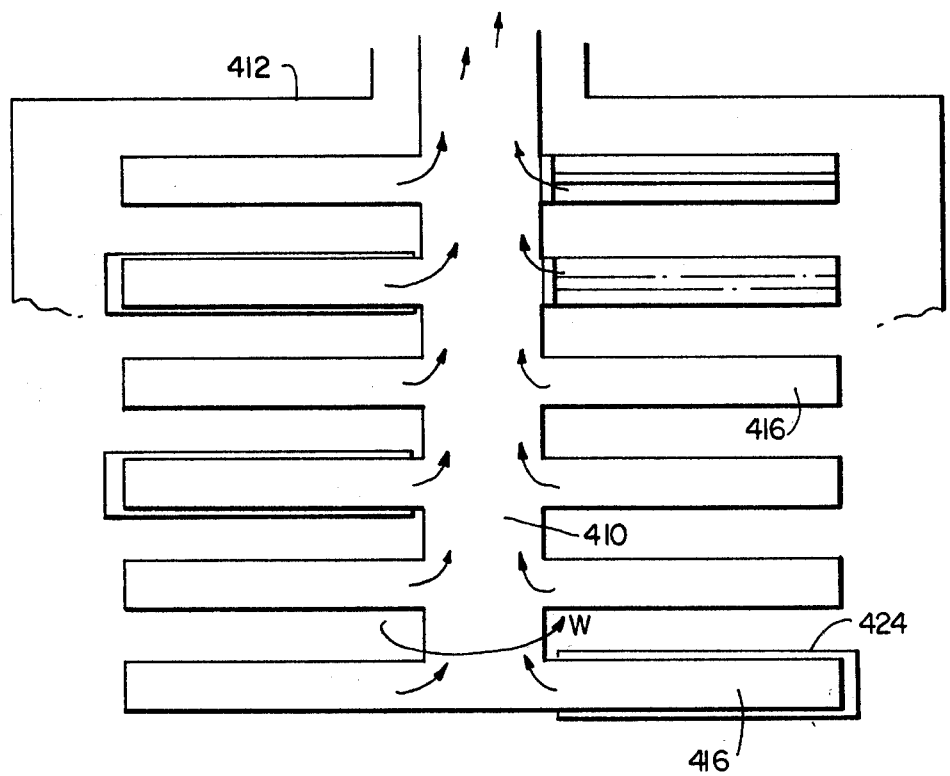
FIG. 10 is a cross-sectional side view of another embodiment of the present invention showing a vertically disposed plenum including a plurality of horizontally positioned elongated cylindrical filters.

Another embodiment of the present invention is shown in FIG. 10 in which a plenum chamber 410 is positioned vertically within the vortexer cannister 412. Radially projecting from the plenum chamber 410 are a plurality of elongated stub members 416 which form a perforated frame upon which the elongated cylindrical bag filters 424 are mounted. As in the embodiments discussed above, the plenum chamber 410 is rotatably mounted upon a shaft 428 which is supported upon a convention thrust bearing 420.

As the fluid containing particulate matter, dust and fines enters the vortexer cannister 412, it is cleaned and exits through the perforated frame members 416 into the interior of the plenum chamber 410 and is exhausted therefrom.

Figure 11:
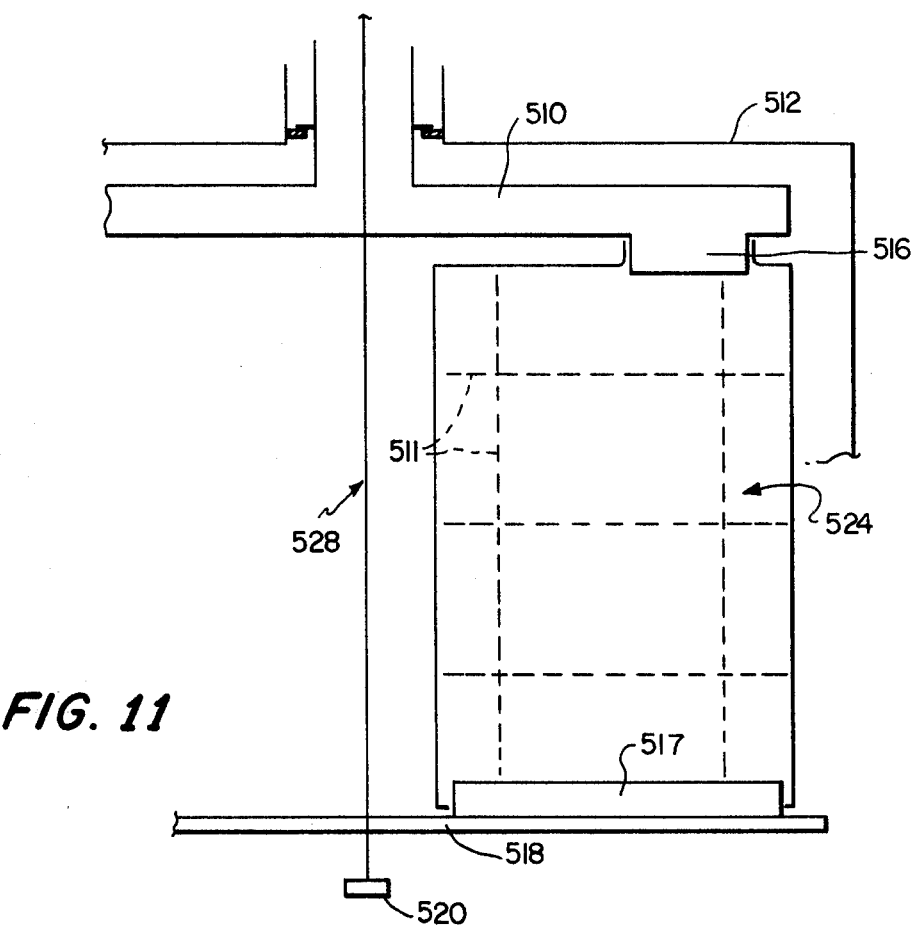
FIG. 11 is a cross-sectional side view of a further embodiment of the present invention showing a multi-sided filter.

Another embodiment of the present invention is shown in FIG. 11. This embodiment includes a vortexer cannister 512 in which is rotatably mounted a plenum chamber to which are removably attached a plurality of multi-sided panel filters 524. The plenum chamber includes a plurality of open ended stub members 516 upon which the pannelled filters 524 are removably mounted. In addition, a lower spider or support panel 518 includes stub members 517 to which the lower end of the cloth panel filters 524 are removably mounted. The shape of the cloth panel filter 524 may be supported by use of expanded metal or rods 511. As mentioned above, the plenum chamber 510 is rotatably mounted within the vortexer cannister 512 by means of the shaft 528 which is supported upon a conventional thrust bearing 520.

FIG. 12 shows a partial cut away view of a self-cleaning filter and vortexer in which the cloth panel filters 524 are shown as either a three-sided elongated triangular filter or a rectangular elongated filter. It should be noted that the panel filters may be attached to the plenum chamber 510 by means of a circular downwardly extending stub 516 or the stub member may be designed to mate with the particular shape of the filter element an example of which is shown in FIG. 12 by the rectangular filter. Also, FIG. 12 shows the baffle B with a hook which acts to enhance the vortex motion in the incoming fluid containing particulate matter and prevents the direct impingement of the incoming fluid onto the panelled filter members 524.

It is understood that the motor which rotates the shafts in all of the embodiments of the present invention may introduce a vibration to the rotating filter members which acts to shake the filters and does enhance the self-cleaning aspect of the filtering members.

Figure 13:
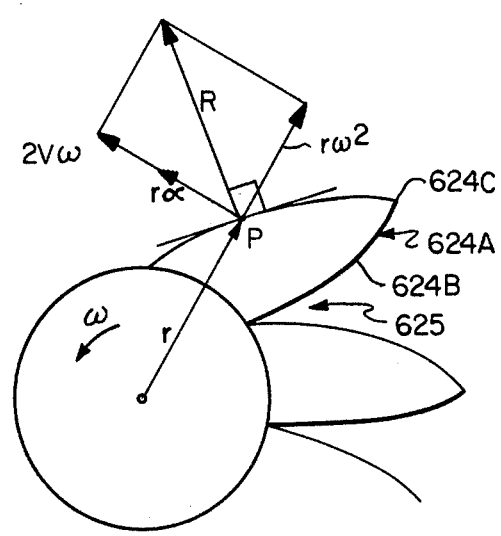
FIG. 13 is a cross-sectional partial view of another embodiment of the filter structure showing one illustration of a Corolis curve.

The profile of the shaped filter 624A as shown in FIG. 13 is specifically designed to utilize both the centrifugal component of acceleration ($r\omega^2$) and the Corolis component ($2V\omega$). The shaped filter 624A is formed from a plurality of filter surfaces 624B which are joined to form radial Corolis curve filter fingers 624C.

In computing the centrifugal component and the Corolis component of acceleration, the following data must be calculated: the velocity ($v$) of a particle in sliding contact with the Corolis curve filter relative to the filter; the uniform angular velocity ($\omega$) of the rotating Corolis filter; and the radial distance ($r$) from the axis of rotation to the point P on the tangent of the Corolis curve filter. The resultant (R) of the Corolis and centrifugal components of acceleration is perpendicular to the tangent of the Corolis curve filter.

The Corolis curve optimizes the self-cleaning action of the rotary filter. Other shapes for the fingers, such as straight lines, involve the combination of the Corolis and the centrifugal components of acceleration but do not optimize the resultant effect. Thus, other filter finger shapes do not minimize the thickness of the particulate which cakes on the filter or minimize the pressure drop across the filter. The circle is the least optimum shape for the rotary filter. It does not utilize the Corolis component of acceleration nor the tangential component if present. In addition, the circular filter does not allow for free rotation of the filter assembly.

The Corolis curve profile filter and the straight line profile filter, together with the hook portion of the baffle, tend to sustain vortexing or circulation of the flow of dust and fluid within the pockets 625 positioned between the filter fingers. This vortexing or circulation of the dust and fluid reduces the pressure drop across the filter system when the system is under a heavy continuous load and provides for continuous dynamic self-cleaning.

The present invention is an improvement over prior art circular cloth filters which include vanes or baffles but do not utilize filter pockets located along the periphery of the filter. These prior art cloth filters subject the cloth material to a direct flow of dust and fluid and do not provide the gradual bleed off as provided by the pocket construction of the present invention, the only acceleration component utilized is the centrifugal.

The Corolis curve profile filter and the straight line profile filter enhance the rotational capability of the filter structure and will actually increase the rotational speed of the filter structure if the loading rate or the particulate size increases. This phenomenon is a result of the free rotational arrangement of the filter structure together with the pockets of the Corolis curve profile or straight line profile fingers which readily adjust to the load and act as impeller blades to the fluid moving tangentially to the fingers and bleeding off into the pockets.

The filter structure of the present invention includes Corolis curve profile or straight line profile fingers which utilize the Corolis component of acceleration, the centrifugal component of acceleration and the circulation within the pockets 625 to achieve the most efficient self-cleaning filter with a minimum pressure drop, regardless of the rate of loading or particle material size. The circulation within the pockets 625 is enhanced by the hook on the baffle B which generates small vortices which move into the pockets. The Corolis curve profile is considered the optimum profile for dynamic self-cleaning. In addition, if the angular velocity is not uniform, the tangential component of acceleration is also effective in self-cleaning. The filter structure is designed with a high fluid to cloth ratio of, approximately, 19 to 1 or more.

The arrangement of the Corolis curve profile or straight line profile fingers of the filter structure results in a larger area of filter cloth per unit length of the rotary filter. The high fluid to cloth ratio combined with the pocket concept yields a smaller vortexer-rotary filter unit compared to existing prior art drum type rotary filters.

As stated above, the rotary filter of the present invention tends to increase in speed to adjust to the heavier loading conditions. This increase in speed creates still another component of acceleration, the tangential component $r\alpha$, which acts together with the Corolis and centrifugal components to enhance the self-cleaning action on one side of the pocket. As the rotary filter reduces speed, the same components of acceleration enhances the self-cleaning action on the other side of the pocket. Referring to FIG. 13, the component $r\alpha$ is zero at constant angular velocity, where $\alpha$ is the angular acceleration.

Still another important aspect of the present invention is the capability of positioning the rotary filter within a large rectangular housing instead of being positioned within a vortexer, as discussed earlier. The positioning of the rotary filters within a large rectangular housing is equivalent to replacing the bags in a bag house with rotary filters. In this manner the CFM requirements of individual systems may be varied by increasing or decreasing the number of rotary filters located within the housing.

As discussed above, the motor drive which may be utilized to rotate any of the shafts of the rotary filters of the present invention may introduce a vibration to the rotary filter member to enhance the self-cleaning ability of the rotary filter. As shown in dotted lines in FIG. 6, one form of a mechanism to impart a vibration to the shaft 228 of the rotary filter may be an off-center weight. The off-center weight W would tend to vibrate the shaft with every rotation of the shaft and filter. Other types of mechanisms may be utilized which would have a similar tendency to impart a vibratory motion to the shaft.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A combination self-cleaning fluid filter and vortexer means for separating particulates from an entraining fluid comprising:

a substantially cylindrical cannister having a tangentially directed inlet port communicating with the interior thereof and a particulate collecting port spaced from said inlet;

a clean fluid outlet port disposed substantially coaxially with the longitudinal axis of said cannister;

filter means mounted over said outlet port within said cannister;

said filter means being mounted over said outlet port for rotation in the same direction as the flow of entraining fluid and particulates entering said cannister from said inlet to preclude caking of said filter means with said particulate material by dynamic self-cleaning action;

arcuate baffle means intermediate said filter means and said tangentially directed inlet port in said cylindrical cannister enhancing vortex flow in the fluid and for shielding said filter means from direct impingement of fluid material from said inlet port;

said baffle means dividing the flow of fluid material in said vortexer to mix cleaner fluid with fluid material from said inlet port on one side thereof and to direct the flow of cleaner fluid about said filter means on the other side thereof; and said filter means comprises a self-rotatable filter rotatable by means of the tangentially directed inlet fluid, said filter means including a plurality of outwardly projecting finger members formed by Corolis curves.

2. The invention defined in claim 1, wherein said self-cleaning filter and vortexer means further includes:

motor means mounted in said fluid outlet port in driving connection with said filter; and said motor means rotating said filter means at an angular velocity sufficient to accelerate said entraining fluid and said particulate material.

3. The invention as defined in claim 2, wherein the motor means includes both a rotary and a vibratory motion.

4. The invention defined in claim 1, wherein said filter means is so shaped and so proportioned as to be impelled by entraining fluid and particulate material entering said inlet port at a peripheral velocity approaching the flow velocity at said inlet port.

5. The invention defined in claim 1, wherein said baffle means subtends at least 90 degrees of arc within said vortexer cannister in the immediate vicinity of said inlet port.

6. The invention defined in claim 5, wherein said self-cleaning filter and vortexer means further includes:

motor means mounted in said fluid outlet port in driving connection with said filter; and said motor means rotating said filter means at an angular velocity sufficient to accelerate said entraining fluid and said particulate material.

7. The invention as defined in claim 6, wherein the motor means includes both a rotary and a vibratory motion.

8. The invention defined in claim 5, wherein said filter means is so shaped and so proportioned as to be impelled by entraining fluid and particulate material entering said inlet port at a peripheral velocity approaching the flow velocity at said inlet port.

9. The invention defined in claim 1, wherein baffle means subtends at least 90 degrees of arc within said vortexer cannister in the immediate vicinity of said inlet port; and further, wherein, said baffle means is at least coextensive in length with said filter means.

10. The invention defined in claim 9, wherein said self-cleaning filter and vortexer means further includes:

motor means mounted in said fluid outlet port in driving connection with said filter; and said motor means rotating said filter means at an angular velocity sufficient to accelerate said entraining fluid and said particulate material.

11. The invention as defined in claim 10, wherein the motor means includes both a rotary and a vibratory motion.

12. The invention defined in claim 9, wherein said filter means is so shaped and so proportioned as to be impelled by entraining fluid and particulate material entering said inlet port at a peripheral velocity approaching the flow velocity at said inlet port.

13. A combination fluid filter and vortexer means for separating particles from an entraining fluid comprising:

a substantially cylindrical cannister having a tangentially directed inlet port communicating with the interior thereof and a particulate collecting port spaced from said inlet;

a clean fluid outlet port disposed substantially coaxially with the longitudinal axis of said cannister;

a filter means being mounted over said outlet port for rotation in the same direction as the flow of entraining fluid and particulates entering said cannister from said inlet to preclude caking of said filter means with said particulate material by dynamic self-cleaning action;

said filter means includes a plenum chamber substantially coaxially arranged with the longitudinal axis of said cannister and including means for supporting filter elements;

said plenum chamber further includes means for directing the flow of clean fluid from the cannister; and said filter means comprises a self-rotatable filter rotatable by means of the tangentially directed inlet fluid, said filter means including a plurality of outwardly projecting finger members formed by Corolis curves.

14. The invention as defined in claim 13, wherein the plenum chamber is substantially horizontally disposed within the cannister and the filter elements are substantially vertically supported from the plenum chamber.

15. The invention as defined in claim 13, wherein the plenum chamber is substantially vertically disposed within the cannister and the filter elements are substantially horizontally supported from the plenum chamber.

16. The invention as defined in claim 15, wherein the substantially horizontally supported filter elements comprise a plurality of tubular elongated filter elements mounted on a spider finger type frame.

17. The invention as defined in claim 13, wherein an arcuate baffle means is positioned intermediate the filter means and said tangentially directed inlet port in said cylindrical cannister for shielding said filter means from direct impingement of fluid material from said inlet port.

18. The invention as defined in claim 17, wherein the arcuate baffle means includes a hook portion for enhancing the vortex flow of the fluid within said cannister.

19. The invention as defined in claim 13, wherein the filter means and the vortexer means further includes:

motor means mounted adjacent said clean fluid outlet port in driving connection with said filter means; and said motor means rotating said filter means at an angular velocity sufficient to accelerate said entraining fluid and said particulate material.

20. The invention as defined in claim 19, wherein an arcuate baffle means is positioned intermediate the filter means and the tangentially directed inlet port in said cylindrical cannister which enhances vortex flow of the fluid and shields said filter means from direct impingement of fluid material from said inlet port.

21. The invention as defined in claim 19, wherein the motor means includes both a rotary and a vibratory motion.

22. The invention as defined in claim 13, wherein the filter means is so shaped and so proportioned as to be impelled by entraining fluid and particulate material entering said inlet port at a peripheral velocity approaching the flow velocity at said inlet port.

23. The invention as defined in claim 22, wherein an arcuate baffle means is positioned intermediate the filter means and the tangentially directed inlet port in said cylindrical cannister which enhances vortex flow of the fluid and shields said filter means from direct impingement of fluid material from said inlet port.

24. The invention as defined in claim 13, wherein the filter means includes a means for imparting rotational motion to said filter means and further includes means for enhancing the flow of clean fluid from the cannister.

25. The invention as defined in claim 24, wherein the means for enhancing the flow of fluid from the cannister comprises a fan rotatably connected to the means for imparting rotational motion to said filter.

26. The invention as defined in claim 13, wherein the substantially cylindrical cannister includes an outwardly projecting member in which is coaxially mounted an outwardly projecting member of said plenum chamber;

the outwardly project member of said cannister includes a first collar securely affixed thereto;

the outwardly projecting member of said plenum chamber includes a second collar rotatably mounted therewith; and said first and second collars being designed to retain a gasket means therebetween for providing an effective dust seal.

27. The invention as defined in claim 13, wherein a plurality of filter means are positioned within said cannister each associated with a plurality of clean fluid outlet ports.

28. The invention as defined in claim 13, wherein said filter elements supported by said plenum chamber are additionally supported by a plate member spaced from said plenum chamber and rotatably mounted therewith.

29. The invention as defined in claim 28, wherein an additional filter element supporting frame member is positioned within the space between the plenum chamber and the plate member.

30. The invention as defined in claim 29, wherein the filter elements positioned between the plenum chamber and the plate member comprise a plurality of elongated tubular filters being additionally supported by a frame member positioned between the plenum chamber and the plate member.

31. The invention as defined in claim 29, wherein the filter elements positioned between the plenum chamber and the plate member comprise a plurality of multi-faceted, elongated filters being additionally supported by a frame member positioned between the plenum chamber and the plate member.

32. The invention as defined in claim 28, wherein the filter elements supported between said plenum chamber and said plate member comprise a plurality of elongated tubular filters.

33. The invention as defined in claim 28, wherein the filter elements supported between the plenum chamber and said plate member comprise a plurality of multi-faceted, elongated filters.

34. The invention as defined in claim 13, wherein the filter elements supported by said plenum chamber comprise a plurality of elongated tubular filters.

35. The invention as defined in claim 13, wherein the filter elements supported by said plenum chamber comprise a plurality of multi-faceted, elongated filters.

36. The invention as defined in claim 13, wherein the outwardly projecting finger members form pockets therebetween which enhance the rotation of the self-rotatable filter.

37. A combination fluid filter and vortexer means for separating particles from an entraining fluid comprising:

a substantially cylindrical cannister having a tangentially directed inlet port communicating with the interior thereof and a particulate collecting port spaced from said inlet;

a clean fluid outlet port disposed substantially coaxially with the longitudinal axis of said cannister;

a filter means being mounted over said outlet port for rotation in the same direction as the flow of entraining fluid and particulates entering said cannister from said inlet to preclude caking of said filter means with said particulate material by dynamic self-cleaning action;

said filter means is rotatable by means of the tangentially directed inlet fluid, said filter means including a plurality of outwardly projecting finger members; and said outwardly projecting finger members are formed by Corolis curves.

38. The invention as defined in claim 37, wherein the outwardly projecting finger members form pockets therebetween which enhance the rotation of the self-rotatable filter.

39. The invention as defined in claim 37, wherein the filter means and the vortexer means further includes:

motor means mounted adjacent said clean fluid outlet port in driving connection with said filter means; and said motor means rotating said filter means at an angular velocity sufficient to accelerate said entraining fluid and said particulate material.

40. The invention as defined in claim 39, wherein the motor means includes both a rotary and a vibratory motion.

41. The invention as defined in claim 37, wherein an arcuate baffle means is positioned intermediate the filter means and said tangentially directed inlet port in said cylindrical cannister for shielding said filter means from direct impingement of fluid material from said inlet port.

42. The invention as defined in claim 41, wherein the arcuate baffle means enhances the vortex flow of the fluid and divides the flow of fluid material into said vortexer to mix cleaner fluid with fluid material from said inlet port on one side thereof and to direct flow of cleaner fluid about said filter means on the other side thereof.

43. The invention as defined in claim 41, wherein the arcuate baffle means includes a hook portion for enhancing the vortex flow of the fluid within said cannister.

* * * * *